United States Patent Office 3,483,148
Patented Dec. 9, 1969

3,483,148
PROTECTIVE COATING COMPOSITION OF BINDER LATEX IN WATER-GLYCOL VEHICLE
Armand J. Desmarais, Newark, Del., assignor to Hercules Incorporated, Wilmington, Del., a corporation of Delaware
No Drawing. Filed Sept. 28, 1967, Ser. No. 671,208
Int. Cl. C09d 3/18, 7/02, 3/74
U.S. Cl. 260—17      10 Claims

ABSTRACT OF THE DISCLOSURE

In a water-based protective coating composition, for example, semi-gloss latex paint, comprising a film former, a suspending agent and a liquid vehicle comprising water-soluble glycol and water with the weight ratio of said glycol to said water being at least about 1:4, the suspending agent consists essentially of hydroxypropyl cellulose having an M.S. of at least 2 and soluble at 20–25° C. in the liquid vehicle.

---

This invention relates to a water-based protective coating composition and more particularly to such a composition wherein the liquid vehicle comprises both water and water-soluble glycol.

Water-based semi-gloss latex paint recently has appeared commercially. It offers the advantages of easy brushability and clean-up, low odor and slightly higher gloss than typical semi-gloss alkyd paints.

Generally, water-based semi-gloss latex paint comprises finely divided pigment material and a finely divided film-former, both of which are dispersed in a liquid vehicle consisting essentially of water and water-soluble glycol. Dissolved in the liquid vehicle is a suspending agent.

The finely divided pigment material consists essentially of at least one pigment. It can include a mixture of pigments. It also can include one or more extenders, examples of which comprise calcium carbonate, china clay, and the like. Examples of a pigment include titanium dioxide, calcium carbonate, and the like.

The finely divided film-former or binder consists essentially of at least one film-forming organic substance. It can comprise more than one such substance. Generally, it is supplied dispersed in a liquid medium, usually comprising water, and the dispersion frequently is referred to as an emulsion or latex. When the liquid medium is substantially removed, for example, by evaporation as when the dispersion is applied as a coating to a surface, the film-former polymerizes and/or coalesces to form a resinous or polymeric film. The usual film-forming organic substance in water-based semi-gloss latex paint is acrylic polymer.

A primary function of the water-soluble glycol is to increase the "open" or wet edge time of the paint, that is, to minimize overlapping brush lap marks. The water-soluble glycol usually is a blend of ethylene glycol and propylene glycol (1,2-propanediol).

A suspending agent is material that increases the consistency and/or the density of the liquid vehicle and thereby minimizes settlement of the particles dispersed or suspended in the liquid vehicle. This terminology includes substances referred to as thickeners, which increase the consistency of, or thicken, the liquid vehicle. Heretofore, the suspending agent in water-based semi-gloss latex paint has comprised for the most part one or more salts of polyacrylic acid.

In addition to the foregoing components, these latex paints also usually comprise surfactant material having a dispersant function and a wetting agent function. A primary purpose of the dispersant function is to minimize flocculation or coagulation of dispersed particles prior to application to a surface to be painted, while a primary purpose of the wetting agent function is to facilitate adherence of the paint to oily surfaces. Usually, but not necessarily, the surfactant material comprises two or more substances, at least one of which acts primarily as a dispersant and at least another of which acts primarily as a wetting agent. Part or all of the surfactant material can be present in the dispersion of film-former as supplied to the paint formulators.

Other components such as a foam depressant, a fungicide, a pesticide, and the like, can also be present.

Heretofore the leveling of water-based semi-gloss latex paint has been only fair. For example, by employing a draw down test procedure developed by the New York Society for Paint Technology, which test procedure results in numerical values on a scale from 0 which denotes poor flow, to 10 which denotes perfect flow, values of 4.0–4.5 have been obtained in testing samples of typical water-based semi-gloss latex paint compositions wherein the suspending agent comprised for the most part ammonium polyacrylate. In this procedure samples of typical semi-gloss alkyd paints give leveling values of about 5.

In attempts to improve the leveling value of water-based semi-gloss latex paints, substances other than ammonium polyacrylate have been employed. Up to now, however, wholly satisfactory results have not been obtained. For example, a leveling value less than 4 was obtained by the foregoing test procedure on a sample of a water-based semi-gloss latex paint in which the glycol concentration was about 30% by weight of the liquid vehicle, and in which the ammonium polyacrylate was wholly substituted by hydroxyethyl cellulose.

There is a need, therefore, for improvement in the leveling value of water-based semi-gloss latex paint and the like.

This invention provides such an improvement. According to this invention, in water-based semi-gloss latex paint having a water-soluble glycol concentration at least about 20% by weight of the liquid vehicle, a generally substantially improved leveling value is obtained when at least a substantial portion of the suspending agent is hydroxypropyl cellulose having certain characteristic properties. For instance, when such a hydroxypropyl cellulose was substituted for the ammonium polyacrylate in a standard water-based semi-gloss latex paint composition, leveling values of 5.5–6.0 were obtained. Such values represent a substantial improvement over leveling values of 4.0–4.5.

In summary, this invention provides a protective coating composition comprising (1) a film-former dispersed in (2) a liquid vehicle consisting essentially of water and water-soluble glycol, the weight ratio of water-soluble glycol to the total quantity of water in the composition being at least about 1:4, and (3) dissolved in said liquid vehicle a suspending agent consisting essentially of hydroxypropyl cellulose having certain properties. These three components are the essential components of the basic composition of this invention. In other words, no other components need be present. However, a preferred general embodiment of this basic composition comprises (4) pigment material dispersed in the liquid vehicle. In addition, preferred specific embodiments comprise (5) surfactant material having at least a dispersant function and preferably a wetting agent function. Additives such as, for example, a preservative, a foam depressant, and the like, can also be present.

The film-former is as previously defined herein. Examples of a film-forming organic substance include polymer substances that can be made by emulsion polymerization, for instance: vinyl polymers, specifically the homopolymers and copolymers of such monomers as vinyl acetate, vinyl chloride, vinylidene chloride, and the like; homopolymers and copolymers of olefinic hydrocarbons such as, for example, ethylene, propylene, 1-butene, styrene, butadiene, isoprene, and the like, examples of such polymers including polyethylene, polypropylene, polystyrene, polybutadiene, polyisoprene, butadiene-styrene copolymer, butadiene-vinyl toluene copolymer, isoprene-styrene copolymer, and the like, as well as oxygenated and halogenated derivatives of these homopolymers and copolymers, for instance, oxygenated polybutadiene, oxygenated polyisoprene, chlorinated polyethylene, and the like; acrylic homopolymers and copolymers containing recurring units of acrylic acid ester, methacrylic acid ester, acrylonitrile or the like units; alkyd resins; reaction products of vinylic hydrocarbon monomers with unsaturated hydrocarbons or the like, such as, for example, the polymeric reaction product of maleic acid and styrene; and, broadly, other polymeric substances including rubberlike or elastomeric material obtainable in stable aqueous latex form and capable of coalescing into a film, preferably a pigmented film, when brushed, sprayed, rolled or otherwise deposited on a surface at normal room conditions (for example, about 20–25° C., 25% relative humidity and normal atmospheric pressure.

The liquid vehicle in the protective coating composition of this invention consists essentially of water-soluble glycol and water. Generally the weight ratio of the water-soluble glycol to the water is in a broad range from about 1:4 to about 1:1. Water here is the total water in the composition, and includes that which accompanies the film former when the composition is made from an aqueous dispersion of the film former. Examples of water-soluble glycol include ethylene glycol, 1,2-propylene glycol, 1,2-butylene glycol, and the like, including blends of two or more of these as well as other specific water-soluble glycols. In preferred embodiments the glycol consists essentially of a blend of ethylene glycol and propylene glycol preferably at a weight ratio of ethylene glycol to propylene glycol in a range about from 1:4 to 1:1, although operable higher and lower weight ratios are within the broader concepts of this invention. Also, in preferred embodiments the weight ratio of the glycol to the total quantity of water in the composition is in a range from about 3:7 to about 9:11. Operable weight ratios, higher than the weight ratios in this preferred range and even higher than the weight ratios in the general range, however, are within the broader concepts of this invention.

The weight ratio of the liquid vehicle to the insoluble portion of the composition (the suspension liquid accompanying the film-former as supplied is considered part of the liquid vehicle in the composition of this invention) is at least sufficient to enable the insoluble portion (usually film-former plus pigment material, if any) to be suspended therein, but less than that at which a substantial part of the particles of film-former are separated from one another when the composition is applied to a surface to be coated. The weight ratio is generally in a range from about 2:1 to about 2:3 and preferably in a range from about 4:5 to about 5:4, but operable higher and lower ratios are within the broader concepts of this invention.

The hydroxypropyl cellulose employed in the composition of this invention has an M.S. (molar substitution) of at least 2 and at 20–25° C. is soluble in the liquid vehicle. The abbrevation M.S. is defined in the U.S. patent, No 3,278,521, to Klug, which discloses and claims hydroxypropyl cellulose comprising these properties. M.S. is the average number of molecules of reactant combined with the cellulose per anhydroglucose unit. The hydroxypropyl cellulose of this patent is commercially available in different viscosity grades, all of which are operable in the composition of this invention. The hydroxypropyl cellulose employed in the composition of this invention generally has an M.S. of 2–10, and preferably has an M.S. of 3–5 In one embodiment of the composition of this invention, the suspending agent is composed only of hydroxylpropyl cellulose. However, in other embodiments the suspending agent comprises at least one other substance that is soluble in the liquid vehicle, that increases the consistency and/or density of the liquid vehicle, and that is compatible with the hydroxypropyl cellulose in the sense of neither one making the other insoluble in the liquid vehicle under normal conditions including storage and use conditions.

The weight ratio of the suspending agent to the liquid vehicle depends generally on the consistency and/or density desired, the quantity of glycol present, the quantity of insoluble material present, range of temperatures expected to be encountered under storage and use conditions, and the like. However, the weight ratio is generally in a range from about 1:400 to about 1:50 and preferably in a range from about 1:300 to about 1:200, but operable higher and lower weight ratios are within the broader concepts of this invention.

The surfactant material in specific embodiments of the protective coating composition of this invention consists essentially of at least one surface active substance soluble in the liquid vehicle, and compatible with the hydroxypropyl cellulose, which substance functions at least as a dispersant (helps to maintain particles apart or dispersed) relative to the film-former particles, and preferably as a dispersant also for the particles of pigment material. While only one such substance is necessary, the surfactant material in preferred specific embodiments usually comprises at least another surface active substance soluble in the liquid vehicle, and compatible with the hydroxypropyl cellulose, which substance functions as a wetting agent for the composition. Surface active substances having these functions are well known and, therefore, need not be further described and discussed herein.

The weight ratio of surfactant material to the liquid vehicle is dependent on many factors such as, for example, properties of each surface active substance present, solids present, and the like. However, it generally is in a range from about 1:400 to about 1:100, and preferably in a range from about 1:350 to about 1:200. Operable higher and lower concentrations are within the broader concepts of this invention.

Additives such as pesticides, anti-foam agents or foam depressants, fungicides, and the like are well known and, therefore, need not be further described and discussed herein.

The coating composition of this invention is made by admixing the components. Preferably, when ball milling is employed to grind the pigment material, the hydroxypropyl cellulose is added in dry condition to the pigment grind. On the other hand, if rapid grinding of the pigment material is involved, preferably the hydroxypropyl cellulose is predissolved in water, water-soluble glycol, or a solution of water and water-soluble glycol, and added to the pigment grind as a stock solution.

The coating composition of this invention is applied by brush, roller or spray gun, depending, as is well known, on the flow characteristics of the composition.

The following examples illustrate preferred specific embodiments of this invention. The claimed subject matter is not limited to these embodiments unless the claim language expressly indicates otherwise.

EXAMPLES 1–6

These examples illustrate specific embodiments of a water-based semi-gloss latex paint composition according to this invention.

The formulations of these specific compositions are as follows:

| Components | Concentration in Parts By Weight | | |
|---|---|---|---|
| | Ex. 1 | Ex. 2 | Ex. 3 |
| Rhoplex AC-22 | 475.31 | 475.31 | 475.31 |
| Rhoplex AC-73 | 130.07 | 130.07 | 130.07 |
| Finely Divided Titanium Dioxide | 234.72 | 234.72 | 234.72 |
| Finely Divided Calcium Carbonate | | | |
| Ethylene Glycol | 39.12 | 39.12 | 39.12 |
| Propylene Glycol | 156.48 | 156.48 | 156.28 |
| Methyl Butyl Ketone | 7.82 | 7.82 | 7.82 |
| Water (separately added) | | | |
| Grade HA Hydroxypropyl Cellulose Product | 1.60 | | |
| Grade M Hydroxypropyl Cellulose Product | | 2.00 | |
| Grade G Hydroxypropyl Cellulose Product | | | 3.50 |
| Pine Oil | 1.96 | 1.96 | 1.96 |
| 25% By Weight Aqueous Solution of Potassium Tripolyphosphate | 7.80 | 7.80 | 7.80 |
| Balab 748 | 3.90 | 3.90 | 3.90 |
| Super Ad-it | 0.98 | 0.98 | 0.98 |
| Triton GR5 | 1.96 | 1.96 | 1.96 |

| Components | Concentration in Parts By Weight | | |
|---|---|---|---|
| | Ex. 4 | Ex. 5 | Ex. 6 |
| Rhoplex AC-22 | 475.31 | 475.31 | 549.22 |
| Rhoplex AC-73 | 130.07 | 130.07 | |
| Finely Divided Titanium Dioxide | 234.72 | 234.72 | 220.75 |
| Finely Divided Calcium Carbonate | | | 17.66 |
| Ethylene Glycol | 39.12 | 39.12 | 35.32 |
| Propylene Glycol | 156.48 | 156.48 | 105.96 |
| Methyl Butyl Ketone | 7.82 | 7.82 | |
| Water (separately added) | | | 105.96 |
| Grade M Hydroxypropyl Cellulose Product | | | 2.00 |
| Grade G Hydroxypropyl Cellulose Product | 4.40 | | |
| Grade E Hydroxypropyl Cellulose Product | | 6.40 | |
| Pine Oil | 1.96 | 1.96 | 1.77 |
| 25% By Weight Aqueous Solution of Potassium Tripolyphosphate | 7.80 | 7.80 | 7.06 |
| Balab 748 | 3.90 | 3.90 | 3.53 |
| Super Ad-it | 0.98 | 0.98 | 0.88 |
| Triton GR5 | 1.96 | 1.96 | 2.21 |

Each of the components in these compositions is commercially available or can be readily made from available chemicals.

The Rhoplex AC-22 and Rhoplex AC-73 products are essentially 100% acrylic polymer latices, the water concentration of the AC-22 product being 55.5% by weight of the product, and the water concentration of the AC-73 product being 54% by weight of the product. The Rhoplex AC-73 product is in the compositions of Examples 1–5 to increase the hardness of the coatings formed when the compositions are applied to a surface.

Each of the hydroxypropyl cellulose products of these examples consists essentially of hydroxypropyl cellulose at a concentration of about 95–97% of the product and has the aforementioned characteristics. Each product has an M.S. of about 4, and is soluble at 20–25° C. in the liquid vehicle. These products differ from one another by the viscosities that result when they are dissolved in water. Thus, a 1% aqueous solution of the Grade HA product at 25° C. has a Brookfield LVF viscometer (Spindle No. 3 at a spindle speed of 30 revolutions per minute) viscosity of 1500–2500 centipoises. A 2% aqueous solution of the Grade M product at 25° C. has a Brookfield LVF viscometer (Spindle No. 3 at a spindle speed of 30 revolutions per minute and a reading multiplication factor of 2) viscosity of 4000–6500 centipoises. A 2% aqueous solution of the Grade G product at 25° C. has a viscosity as determined by a Brookfield LVF viscometer (Spindle No. 2 at a spindle speed of 60 revolutions per minute) of 150–400 centipoises. A 5% aqueous solution of the Grade J product at 25° C. has a viscosity as measured by a Brookfield LVF viscometer (Spindle No. 2 at a spindle speed of 60 revolutions per minute) of 150–400 centipoises. A 5% aqueous solution of the Grade L product at 25° C. has a Brookfield LVF viscometer (Spindle No. 1 at a spindle speed of 60 revolutions per minute) of 75–150 centipoises. A 10% aqueous solution of the Grade E product at 25° C. has a viscosity as measured by a Brookfield LVF viscometer (Spindle No. 1 at a spindle speed of 60 revolutions per minute) of less than 300 centipoises.

Consequently, with all other factors being the same, different quantities of these products must be used in a given formulation to obtain a protective coating composition with a desired consistency.

The Balab 748 product consists essentially of kerosene and a silicone antifoaming agent.

The Super Ad-it product consists essentially of di-(phenylmercuric) dodecenyl succinate. It is in each formulation primarily as a preservative.

The Triton GR-5 product is an aqueous solution consisting essentially of 2-propanol at a concentration of 20% by weight, dioctyl sodium sulfosuccinate at a concentration of about 60% by weight, and water. It is employed in each formulation as a wetting agent.

In the paint compositions of Examples 1–5 the weight ratio of total glycol to total water is substantially 1:1.7, while in the paint compositions of Example 6 the weight ratio of total glycol to total water is substantially 1:2.9.

Each of the paint compositions of these formulations is made by ball milling together for 16 hours in Examples 1–5 the Rhoplex AC-22 and AC-73 products, the titanium dioxide, the propylene gycol, the Tamol 731 product and the Balab 748 product, and in Example 6 the Rhoplex AC-22 product, the Atomite calcium carbonate, the propylene glycol, the Tamol 731 product and the Balab 748 product. Subsequently, in each example the remaining components are admixed until a homogeneous blend is obtained.

The specific paints of these examples, when applied to surfaces to be coated, have excellent heat stability up to 75° C., very satisfactory scrubbability, good gloss, satisfactory hardness, and high leveling values.

Samples of these specific compositions have been made and tested according to the aforementioned draw down test procedure of the New York Society for Paint Technology. Also tested according to this procedure was a sample of a composition having the same formulation as the composition of Example 1, except that, instead of the hydroxypropyl cellulose product, it contained 5.9 parts of the ammonium polyacrylate which the suspending agent heretofore comprised. This sample is referred to hereinafter as the ammonium polyacrylate sample. In addition there was tested according to the procedure a sample of a composition having the same formulation as the composition of Example 1 except that it contained 2.0 parts of a hydroxyethyl cellulose product having an M.S. of 2.5 and of a viscosity grade similar to the Grade M hydroxypropyl cellulose product. This sample is referred to hereinafter as the hydroxyethyl cellulose sample. The results of these tests are summarized as follows.

Sample identification: Leveling value
　Ex. 1 _____ 6
　Ex. 2 _____ 6
　Ex. 3 _____ 6.5
　Ex. 4 _____ 5.5
　Ex. 5 _____ 6
　Ex. 6 _____ 5.5
　Ammonium polyacrylate sample _____ 4.5
　Hydroxyethyl cellulose sample _____ 4.0

Thus, this invention provides a water-based acrylic polymer type semi-gloss latex paint of substantially improved leveling value.

EXAMPLE 7

This example illustrates a preferred specific embodiment of a water-based semi-gloss poly(vinyl acetate-ethylene) latex paint of this invention.

The formulation of this embodiment is:

| Components: | Concentration in parts by weight |
|---|---|
| Aircoflex 510 product | 1362.0 |
| Finely divided titanium dioxide | 601.2 |
| Finely divided calcium carbonate | 48.0 |
| Ethylene glycol | 95.4 |
| Propylene glycol | 603.6 |
| Texanol product | 27.0 |
| Water (separately added) | 224.8 |
| 28% by weight aqueous solution of Grade M hydroxypropyl cellulose product | 451.3 |
| Pine oil | 4.8 |
| 25% by weight aqueous solution of potassium tripolyphosphate | 19.2 |
| Colloid 60 | 9.6 |
| Super Ad-it | 2.4 |
| Igepal CO-610 | 10.8 |

The Aircoflex 510 product is an aqueous emulsion consisting essentially of poly(vinyl acetate-ethylene) dispersed in water, the total solids concentration being 55% by weight and the water concentration being 45%.

The Texanol product consists essentially of 3-hydroxy-2,2,4-trimethylpentyl isobutyrate.

The Colloid 60 product is a kerosene solution of a silicone. The product is present as an anti-foam agent.

The Super Ad-it product is described relative to Examples 1–6.

The Grade M hydroxypropyl cellulose product is described in Examples 1–6.

The Igepal CO-610 product consists essentially of nonyl phenoxy poly(ethyleneoxy) ethanol.

In the foregoing formulation the weight ratio of total glycol to total water is substantially 1:1.9.

The paint of this formulation is made as follows. The potassum tripolyphosphate, 4.8 parts by weight of the Colloid 60 product and 263.2 parts by weight of the propylene glycol are placed in a container. While stirring the contents at 1900 revolutions per minute with a Cowles Dissolver, the titanium dioxide and calcium carbonate are added. The speed of the Cowles Dissolver is increased to 5400 revolutions per minute and this speed is maintained for 10 minutes. After reducing the speed to 1900 revolutions per minute, the remaining components are added and the resulting mixture stirred until it has become a homogeneous mixture. This mixture is the desired porduct.

A typical leveling value of this product is 6.

Thus, this invention provides a water-based semi-gloss poly(vinyl acetate-ethylene) latex paint with a good leveling value.

Other advantages, features and specific embodiments of this invention will be readily apparent to those in the exercise of ordinary skill in the art after reading the foregoing disclosures. Such specific embodiments are within the scope of the claimed subject matter unless expressly excluded by claim language. Moreover, while specific embodiments of this invention have been described in considerable detail, variations and modifications of the embodiments can be effected without departing from the spirit and scope of the invention as claimed.

What I claim and desire to protect by Letters Patent is:

1. A protective coating composition comprising (1) a liquid vehicle comprising water-soluble glycol and water with the weight ratio of said glycol to said water being at least about 1:4, (2) a film former dispersed in said liquid vehicle, and (3) as suspending agent, hydroxypropyl cellulose having an M.S. of at least 2 and at 20–25° C. soluble in said liquid vehicle, said hydroxypropyl cellulose being at a concentration sufficient to substantially minimize settlement of the insoluble portion of said composition, wherein M.S. means molar substitution.

2. A composition according to claim 1, which additionally comprises pigment material dispersed in said liquid vehicle.

3. A composition according to claim 2, wherein said glycol comprises ethylene glycol and propylene glycol.

4. In a water-based latex paint comprising a film former dispersed in a liquid vehicle comprising water and water-soluble glycol with the weight ratio of said water-soluble glycol to said water being at least about 1:4, and containing a suspending agent at a concentration sufficient to substantially minimize settlement of the insoluble portion of said paint, the improvement wherein said suspending agent consists essentially of hydroxypropyl cellulose having an M.S. of at least 2 and soluble at 20–25° C. in said liquid vehicle, wherein M.S. means molar substitution.

5. A paint according to claim 4, which includes pigment material also dispersed in said liquid vehicle.

6. A paint according to claim 5, wherein the weight ratio of said suspending agent to said liquid vehicle is in a range from about 1:400 to about 1:50.

7. A paint according to claim 6, wherein the weight ratio of said suspending agent to said liquid vehicle is in a range from about 1:350 to about 1:200.

8. A paint according to claim 7, wherein the weight ratio of said glycol to said water is in a range from about 3:7 to about 9:11.

9. A paint according to claim 8, wherein said glycol comprises ethylene glycol and propylene glycol.

10. A paint according to claim 9, wherein the weight ratio of said ethylene glycol to said propylene glycol is in a range from about 1:4 to about 1:1.

References Cited

UNITED STATES PATENTS

| 3,150,110 | 9/1964 | Becker et al. | 260—17 |
| 3,215,660 | 11/1965 | Bryan et al. | 260—29.6 |
| 3,278,521 | 10/1966 | Klug | 260—231 |

HAROLD D. ANDERSON, Primary Examiner

E. NIELSEN, Assistant Examiner

U.S. Cl. X.R.

117—161; 260—29.6, 29.7, 33.4